United States Patent
Hawkins et al.

[11] 3,876,228
[45] Apr. 8, 1975

[54] PASSIVE INSTRUMENT PANEL

[75] Inventors: Ralph W. Hawkins, Birmingham; Fred J. Irish, Clarkston; Robert A. Potter, Warren, all of Mich.

[73] Assignee: General Motors Corporation, Detroit, Mich.

[22] Filed: June 17, 1974

[21] Appl. No.: 479,809

[52] U.S. Cl. .................... 280/150 B; 180/90
[51] Int. Cl. .................................. B60r 21/04
[58] Field of Search ............. 280/150 B; 180/90; 296/28 R, 28 G

[56] References Cited
UNITED STATES PATENTS

| | | | |
|---|---|---|---|
| 3,774,713 | 11/1973 | Stegmaier | 280/150 B |
| 3,801,126 | 4/1974 | Knight | 180/90 |
| 3,817,553 | 6/1974 | Wilfert | 280/150 B |
| 3,831,705 | 8/1974 | Glance | 180/90 |

Primary Examiner—Robert R. Song
Attorney, Agent, or Firm—John P. Moran

[57] ABSTRACT

An instrument panel arrangement including an improved upper panel assembly and a padded knee-panel assembly which moves forward upon impact and which includes a plurality of forwardly extending members which move forwardly with the panel a predetermined distance to cause the windshield to shatter, and which additionally includes tear-strip means for permitting some continued forward movement after the forwardly extending members stop.

6 Claims, 10 Drawing Figures

PASSIVE INSTRUMENT PANEL

The various vehicular occupant restraint systems in use today, such as padded instrument panels, seat belts, shoulder harnesses, and inflatable cushions or "air bags," are functioning satisfactorily. While not being suggested as a replacement for any of the aforementioned systems, a possible alternate arrangement which would be used, if desired, is a passive instrument panel which includes provisions for lessening the severity of any operator impact with the panel itself and with the windshield, should seat belts and/or shoulder harnesses, or air bags, not be used. Such an instrument panel includes an improved upper panel assembly and a padded knee-panel assembly which moves forward upon impact by the operator and which includes means for shattering the windshield during its forward course, prior to any contact therewith by the operator or passenger.

Accordingly, an object of the invention is to provide an improved passive instrument panel which includes provisions for lessening the severity of any operator impact therewith, both in the upper head and chest area, and in the lower knee area.

Another object of the invention is to provide an improved passive instrument panel which includes a padded knee-panel which moves forward upon impact by the operator, with means associated therewith for shattering the windshield during such forward movement.

A further object of the invention is to provide a passive instrument panel which has associated therewith a knee-abutment panel having forwardly extending rigid members, the knee-abutment panel being movable relative to the forwardly extending members via either foam blocks or tear strips operatively connected therebetween. The forwardly extending members may be either secured to the firewall or left free to move forwardly to contact and, thus, shatter the windshield.

These and other objects and advantages of the invention will be apparent when reference is made to the following description and accompanying drawings, wherein.

Figure 1:
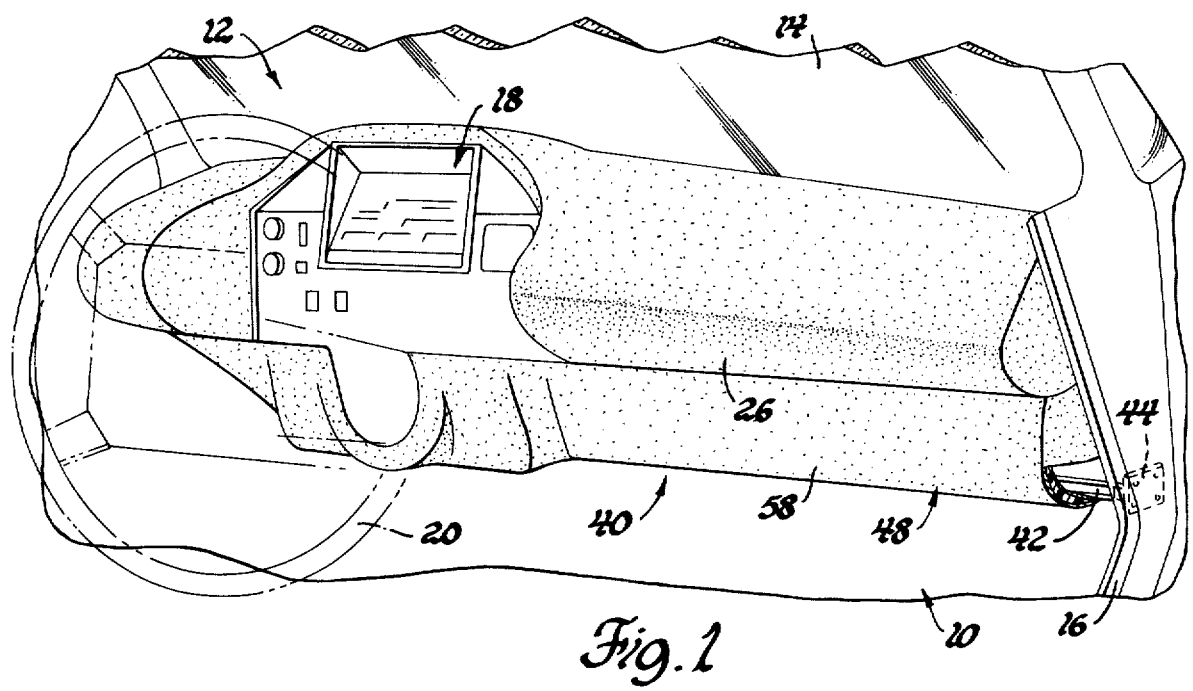
FIG. 1 is a fragmentary perspective view of an automotive instrument panel arrangement embodying the invention.

Referring to the drawings in greater detail, FIG. 1 illustrates an automobile body, represented generally as 10, including an instrument panel arrangement 12 operatively connected to a windshield 14 intermediate the usual front door hinge pillars 16. A conventional instrument cluster 18 is mounted in the panel arrangement 12, just forward of the steering wheel 20. As better shown in FIG. 2, the instrument panel arrangement 12 includes an upper assembly 21 comprising a J-shaped, thin sheet metal substrate or base member 22 covered by a layer of suitable foam 24 of a predetermined thickness. The foam layer 24 is, in turn, covered by a layer of decorative vinyl 26.

Figure 2:
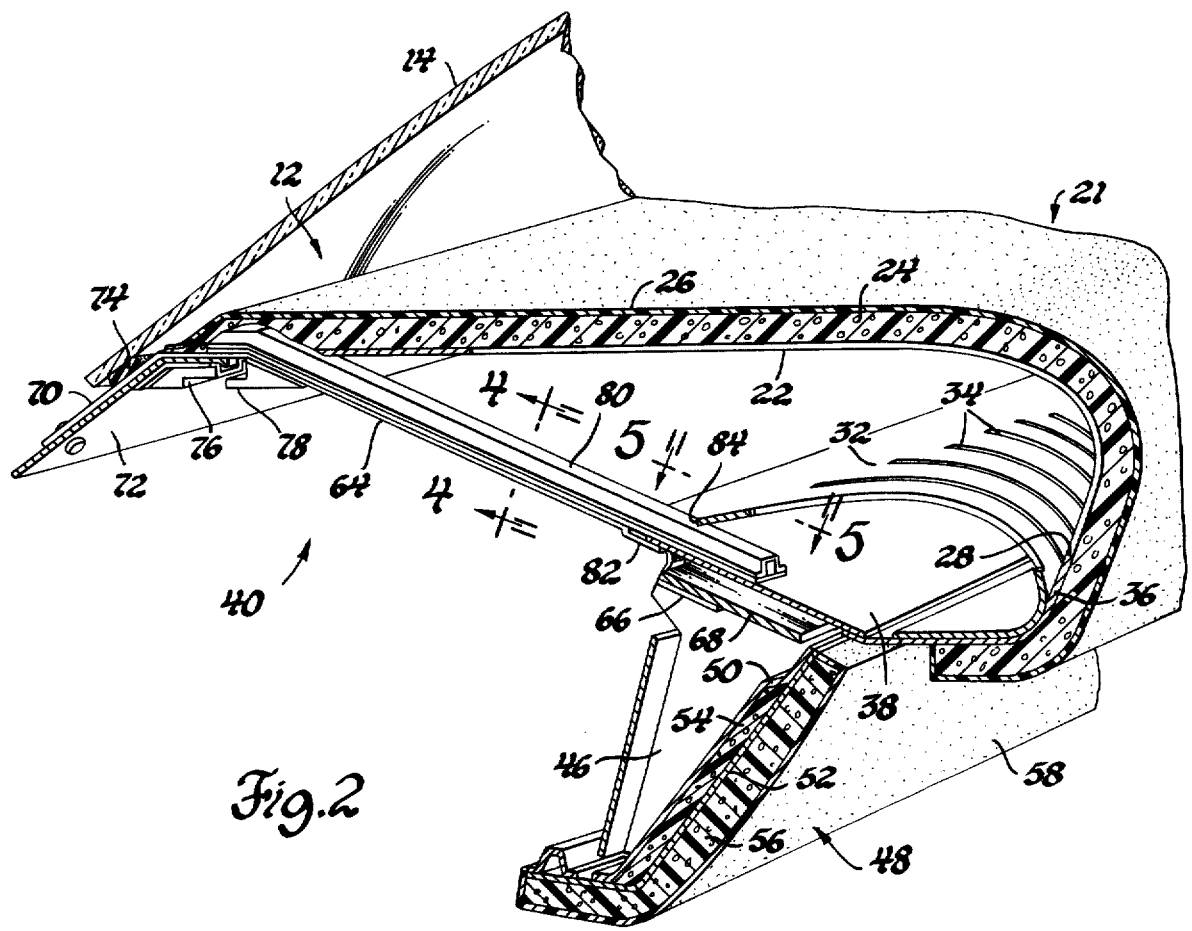
FIG. 2 is a cross-sectional view of an instrument panel embodying the invention.
Figure 3:
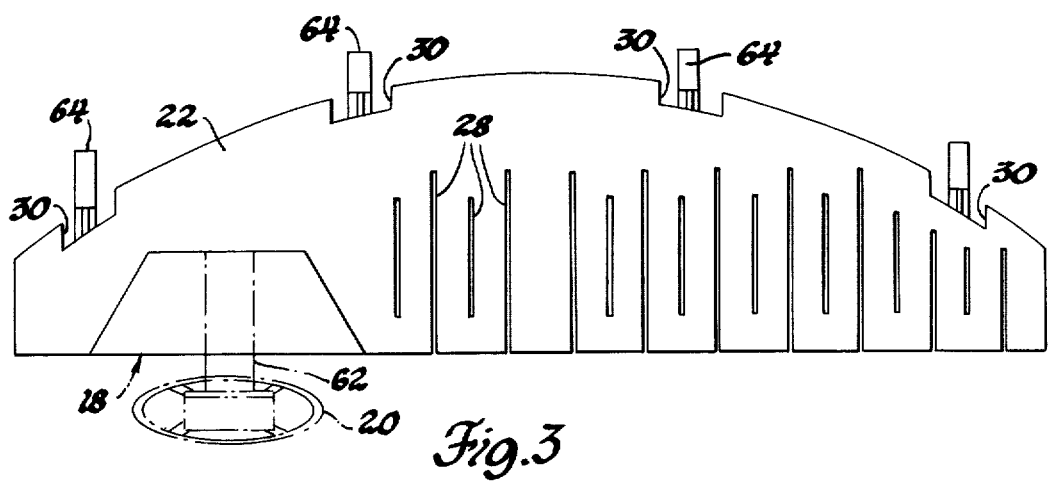
FIG. 3 is a top view of a portion of the FIGS. 1 and 2 structure.
Figure 4:
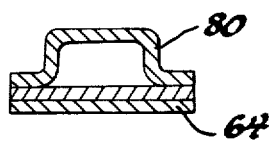
FIG. 4 is a cross-sectional view taken along the plane of line 4—4 of FIG. 2, and looking in the direction of the arrows.
Figure 5:
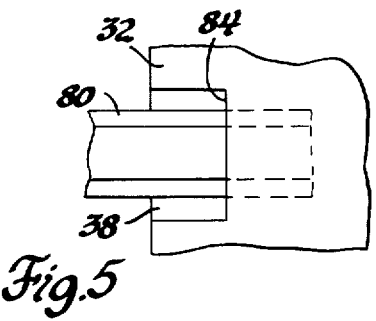
FIG. 5 is a cross-sectional view taken along the plane of line 5—5 of FIG. 2, and looking in the direction of the arrows.

As noted in FIG. 3, the sheet metal base member 22 includes a plurality of spaced longitudinal slots 28 intermediate the instrument cluster 18 and the right-hand edge thereof. Four notches 30 are formed at spaced intervals along the forward edge of the base member 22. An arcuate-shaped reinforcement member 32 (FIG. 2), also formed of thin sheet metal and having a plurality of parallel slots 34 formed therein, is secured within the rear or bowed portion 36 of the base member 22, along the full width thereof. A flat plate 38 is secured at one edge thereof to the lower edge of the base member 22, adjacent an edge of the reinforcement member 32, extending forward therefrom.

It may be realized that, in a crash situation, any contact with the upper instrument panel assembly 21 and the associated reinforcement member 32, beyond a predetermined force, will cause the assembly 21 to "balloon," by virtue of the thickness of the base and reinforcement members 22 and 32 and their associated slots 28 and 34, thus providing greater "ride-down" distance and rate for the impacting body. By virtue of the slots 28 and 34 being formed substantially completely across the respective members 22 and 32, the improved impact features will prevail regardless of the front seat occupant's size and lateral position.

A knee-panel assembly 40 (FIG. 2) is operatively connected intermediate the flat plate 38 and the lower edge of the windshield 14. Specifically, the knee-panel assembly 40 includes a lower support member 42 (FIG. 8) secured by suitable mounting plates 44 and associated tear-strips 45 at the ends thereof to the front door hinge pillars 16 (FIG. 1). Four brackets 46 extend upwardly from the lower support member 42 at spaced intervals along the length thereof. The knee-panel assembly 40 further includes a knee-abutment wall arrangement 48 consisting of a pair of plates 50 and 52 (FIG. 2) connected at their respective upper and lower ends, and spaced apart intermediate such ends so as to accommodate a rigid foam core 54. The plate 50 is secured to the forward surfaces of the four brackets 46. A layer of suitable foam 56 is secured to the outer surface of the plate 52 along the full width thereof, covered by a layer of vinyl 58. A cut-out portion 60 (FIG. 8) is formed in all of the components of the knee-abutment wall arrangement 48 for the extension therethrough of the usual steering column 62 (FIg. 3).

Four tear-strips 64 (FIGS. 2 and 6) are secured by respective off-set mounting tabs 66 to the undersides of upper flanges 68 of the brackets 46. The forward ends 70 of the tear-strips 64 are secured to the cowl structure 72, with the lower edge of the windshield 14 secured by suitable adhesive 74. Stop members 76 are secured to the cowl structure 72, in alignment with adjacent abutment members 78 secured to the underside of the respective tear-strips 64. A flanged, channel-shaped stiffener 80 is secured to the top surface of each tear-strip 64 by any suitable means, such as welding. As shown in FIG. 2, the forward end of the flat plate 38 is slidably mounted between a bend 82 formed in each tear-strip 64 and the extended end of each respective stiffener 80. Suitable notches 84 are formed in the reinforcement member 32 to accommodate the extension therethrough of the respective stiffeners 80, the edge of the reinforcement member 32 being secured in any suitable manner to the forward edge of the plate 38 intermediate adjacent stiffeners 80.

Figures 6, 7:
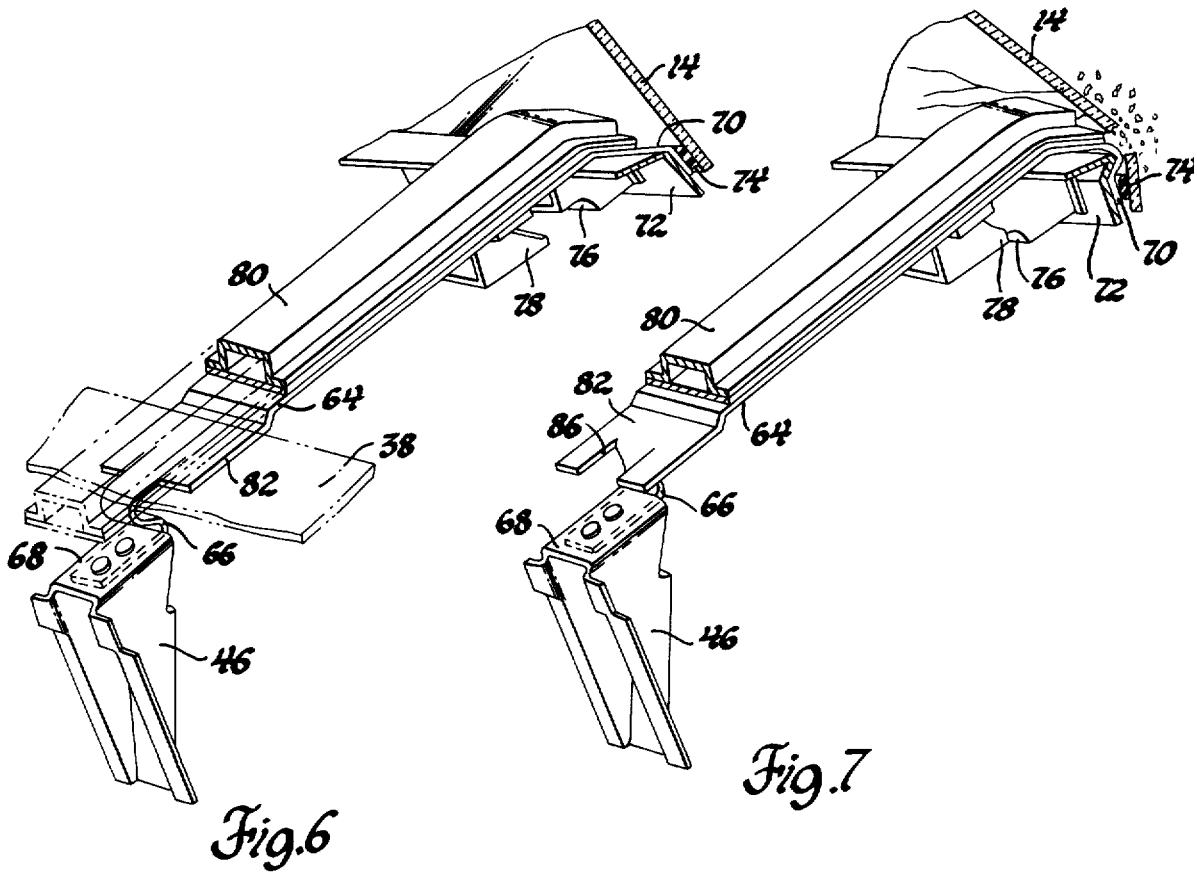
FIGS. 6 and 7 are perspective views of components of the FIG. 2 structure shown in different operational positions.

Referring now to FIGS. 6 and 7, it may be realized that the tabs 66 extend from a central portion of the width of the respective tear-strips 64. It should be apparent that, in a crash situation, upon impact of an operator's knees against the foam layer 56 (FIG. 2), the brackets 46 and the associated tabs 66 will be pushed forward by virtue of the tear-strips 45 tearing or folding away from the mounting plates 44, and the tabs 66 causing the tear-strips 64 and stiffeners 80 to move forward, the forwardmost ends thereof extending through the notches 30 (FIG. 3) of the instrument panel base member 22, causing the windshield 14 to shatter (FIG. 7). Once the abutment members 78 contact the respective stop members 76, the tabs 66 may continue to move forward with continued forward movement of the operator, tearing or folding along the center portion of the respective tear-strips 64, as at 86 (FIG. 7).

Hence, should seat belts and/or shoulder harnesses, or air bags, not be used it is apparent that, with the windshield 14 thus shattered prior to any contact therewith by the operator, the severity of any impact therewith would be somewhat lessened.

Figure 8:
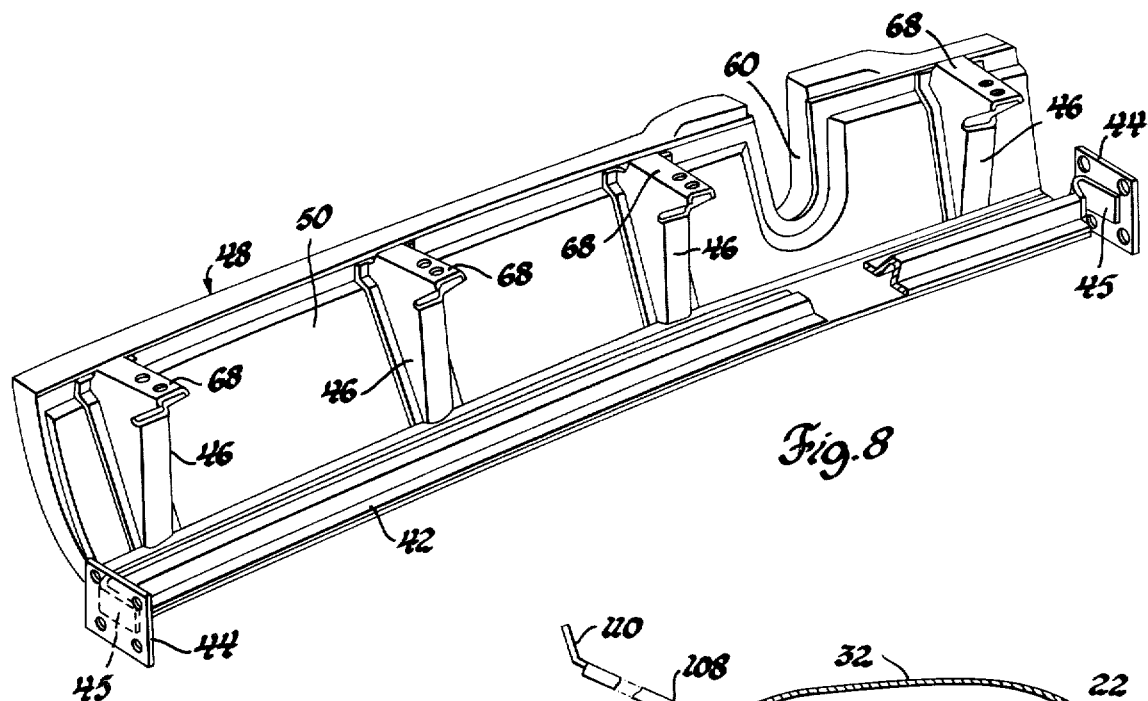
FIG. 8 is a perspective view of a portion of the FIG. 2 structure, as viewed from the forward side thereof.
Figure 9:
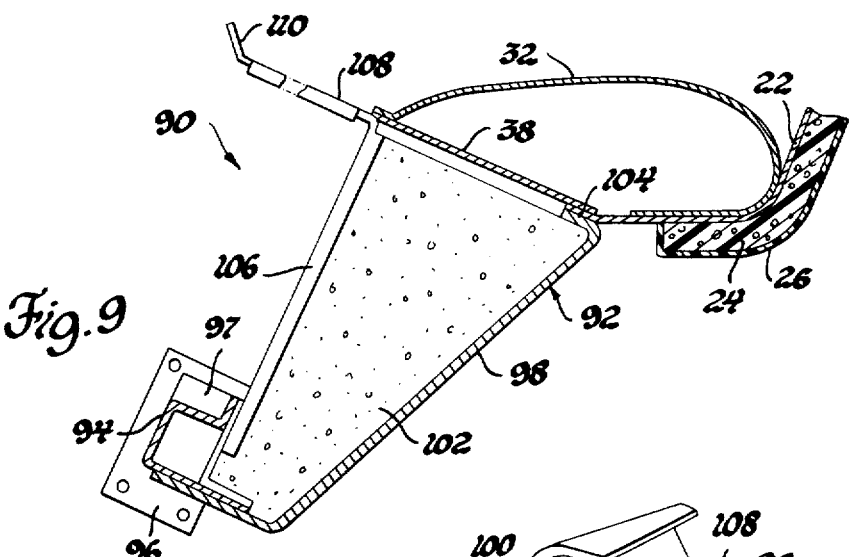
FIG. 9 is a cross-sectional view of an alternate embodiment of the invention.
Figure 10:
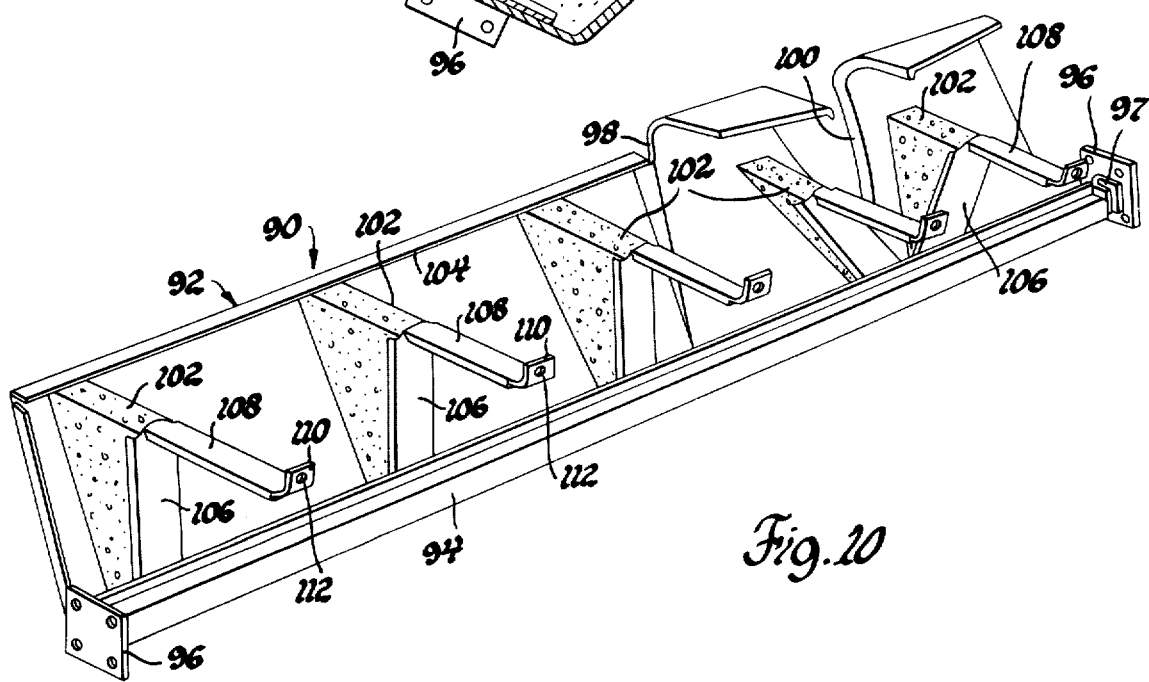
FIG. 10 is a perspective view of a portion of the FIG. 9 structure, as viewed from the forward end thereof.

The alternate embodiment shown in FIGS. 9 and 10 illustrates a knee-panel assembly 90 which includes a knee-abutment wall arrangement 92 having a lower support member 94 which is secured by suitable mounting plates 96 and associated tear-strips 97 at the ends thereof to the front door hinge pillars 16 (FIG. 1), as was the case with the knee-abutment wall arrangement 48 of FIG. 8. The arrangement 92 further includes a wall 98 extending upwardly from the lower support member 94 and having a cut-out portion 100 formed therein for the extension therethrough of the usual steering column 62 (FIG. 3). A plurality of substantially rigid foam supports or blocks 102 are secured at spaced intervals on the forward side of the wall 98. A flange 104 formed at the top of the wall 98, and a front cover plate 106 secured to the lower support member 94 serve to retain the foam blocks 102. Forwardly extending braces 108 are secured to and extend from the upper ends of the respective cover members 106. Suitable brackets or flanges 110 are formed on the forward ends of the respective braces 108 with openings 112 formed therein, serving as a means to connect the braces 108 to the cowl or firewall 72 (FIG. 2).

As may be noted in FIG. 9, the arcuate-shaped reinforcement member 32 and the plate 38, which is secured to the edges of the reinforcement member 32, simply rest as a unit on the upper surface formed by the braces 108 at the forward end and by the flange 104 at the rearward end.

Thus, it is apparent that, upon contact with the knee-abutment wall 98, such impact will be cushioned by the energy-absorbing feature of the adjacent foam supports or blocks 102, while any contact with the upper instrument panel assembly 21 will cause such upper panel, along with the reinforcement member 32, to cushion the impact both ballooning and sliding forward on the braces 108. If the impact force is great enough, the tear-strips 97 will tear or fold away from the mounting plates 96.

While but two embodiments of the invention have been shown and described, other modifications thereof are possible.

What is claimed is:

1. For use with an automotive firewall and front door hinge pillars, a passive instrument panel arrangement comprising a padded instrument panel assembly, a knee-abutment panel assembly mounted so as to support one end of said padded instrument panel assembly, said knee-abutment panel assembly including a base support member, an abutment plate, a plurality of spaced brackets secured to said base support member, a plurality of tear-strips connecting said base support member to said front door hinge pillars, a plurality of forwardly extending members operatively connected between said abutment plate and said firewall, resilient means operatively connected between said forwardly extending members and said abutment plate, said resilient means enabling said abutment plate to move forward in response to a predetermined manual impact force against said abutment plate, with said tear-strips adapted to tearing forwardly with respect to said front door hinge pillars.

2. For use with an automotive firewall and associated windshield, a passive instrument panel arrangement comprising a knee-abutment panel slidably mounted with respect to said instrument panel, said knee-abutment panel including an abutment plate, a plurality of spaced brackets secured to said abutment plate, a plurality of tear-strips connecting said brackets to a plurality of forwardly extending members, a plurality of stop members mounted on said firewall, and a plurality of abutments formed on said forwardly extending members in alignment with said stop members and spaced apart therefrom a predetermined distance, said abutments moving forward in response to a predetermined manual impact force against said abutment plate, causing the ends of said forwardly extending members to shatter said windshield prior to said abutments contacting said stop members, with said tear-strips tearing forwardly with respect to said forwardly extending members once said latter members stop their forward movement.

3. For use with an automotive firewall and associated windshield, a passive instrument panel arrangement comprising an upper instrument panel assembly including a substantially J-shaped, padded thin metal base member, a plurality of vertical slots formed in a rounded edge of said base member; a knee-abutment panel assembly slidably mounted with respect to said upper instrument panel assembly, said knee-abutment panel assembly including a padded abutment plate, a plurality of spaced brackets secured to said abutment plate, a plurality of tear-strips connecting said brackets to a plurality of forwardly extending members, a plurality of stop members mounted on said firewall, and a plurality of abutments formed on said forwardly extending members in alignment with said stop members and spaced apart therefrom a predetermined distance, said abutments moving forward in response to a predetermined manual impact force against said padded abutment plate, causing the ends of said forwardly extending members to shatter said windshield prior to said abutments contacting said stop members, with said tear-strips tearing forwardly with respect to said forwardly extending members once said latter members stop their forward movement.

4. For use with an automotive firewall and front door hinge pillars, a passive instrument panel arrangement comprising an upper padded instrument panel assembly secured at the forward end thereof to said firewall, said assembly including a substantially J-shaped padded thin metal base member, a first plurality of vertical slots formed in a rounded edge of said base member, reinforcement means secured to said rounded edge, and a second plurality of vertical slots formed in said reinforcement means, said first and second pluralities of vertical slots serving to permit said assembly to compress in a ballooning fashion in response to a predetermined manual impact force against said padded base member; a knee-abutment panel assembly including a base support member, a plurality of tear-strips connecting said base support member to said front door hinge pillars, a padded abutment plate extending upwardly from said base support member, a plurality of spaced brackets operatively connected to said abutment plate and to said base support member, said reinforcement means being slidably mounted on said spaced brackets, a plurality of forwardly extending members operatively connected between said abutment plate and said firewall, resilient means operatively connected between said forwardly extending members and said abutment plate, said plurality of tear-strips tearing forwardly with respect to said front door hinge pillars and said padded abutment plate moving forward in conjunction with said resilient means in response to a predetermined manual impact force against said padded abutment plate.

5. For use with an automotive firewall and front door hinge pillars, a passive instrument panel arrangement comprising an upper padded instrument panel assembly secured at the forward end thereof to said firewall, said assembly including a substantially J-shaped padded thin metal base member, a first plurality of vertical slots formed in a rounded edge of said base member, reinforcement means secured to said rounded edge, a second plurality of vertical slots formed in said reinforcement means, said first and second pluralities of vertical slots serving to permit said assembly to compress in a ballooning fashion in response to a predetermined manual impact force against said padded base member; a knee-abutment panel assembly including a base support member, a plurality of tear-strips connecting said base support member to said front door hinge pillars, a padded abutment plate extending upwardly from said base support member and adapted to being moved toward said firewall with respect to said upper instrument panel assembly, a plurality of spaced brackets secured to said abutment plate and to said base support member, said reinforcement means being slidably mounted on said spaced brackets, and a compressible foam block mounted intermediate each of said spaced brackets and said padded abutment plate, said plurality of tear-strips tearing forwardly with respect to said front door hinge pillars and said abutment plate moving forward so as to compress said foam blocks in response to a predetermined manual impact force against said padded abutment plate.

6. For use with an automotive firewall, windshield, and front door hinge pillars, a passive instrument panel arrangement comprising an upper padded instrument panel assembly secured at the forward end thereof to said firewall, said assembly including a substantially J-shaped padded thin metal base member, a first plurality of vertical slots formed in a rounded edge of said base member, reinforcement means secured to said rounded edge, a second plurality of vertical slots formed in said reinforcement means, said first and second pluralities of vertical slots serving to permit said assembly to compress in a ballooning fashion in response to a predetermined manual impact force against said padded base member; a knee-abutment panel assembly slidably mounted with respect to said upper instrument panel assembly, said knee-abutment panel assembly including a base support member, a first plurality of tear-strips connecting said base support member to said front door hinge pillars, an abutment plate extending upwardly from said base support member, a plurality of spaced brackets secured to said abutment plate and to said base support member, said reinforcement means being slidably mounted on said spaced brackets, a second plurality of tear-strips connecting said brackets to a plurality of forwardly extending members, a plurality of stop members mounted on said firewall, and a plurality of abutments formed on said forwardly extending members in alignment with said stop members and spaced apart therefrom a predetermined distance, said first plurality of tear-strips tearing forwardly with respect to said front door hinge pillars and said abutments moving forward in response to a predetermined manual impact force against said abutment plate, causing the ends of said forwardly extending members to shatter said windshield prior to said abutments contacting said stop members, with said second plurality of tear-strips tearing forwardly with respect to said forwardly extending members once said latter members stop their forward movement.

* * * * *